(12) United States Patent
Juhlin et al.

(10) Patent No.: US 10,404,794 B2
(45) Date of Patent: Sep. 3, 2019

(54) DISCOVERY AND FORMATION OF LOCAL COMMUNICATION GROUP

(71) Applicant: Orion Labs, San Francisco, CA (US)

(72) Inventors: Ellen Juhlin, San Francisco, CA (US); Greg Albrecht, San Francisco, CA (US)

(73) Assignee: Orion Labs, San Francisco, CA (US)

( * ) Notice: Subject to any disclaimer, the term of this patent is extended or adjusted under 35 U.S.C. 154(b) by 0 days.

(21) Appl. No.: 15/627,901

(22) Filed: Jun. 20, 2017

(65) Prior Publication Data

US 2017/0366607 A1 Dec. 21, 2017

Related U.S. Application Data

(60) Provisional application No. 62/352,607, filed on Jun. 21, 2016.

(51) Int. Cl.
*H04L 29/08* (2006.01)
*H04L 29/06* (2006.01)

(52) U.S. Cl.
CPC ...... *H04L 67/1044* (2013.01); *H04L 67/1068* (2013.01); *H04L 67/1061* (2013.01); *H04L 69/24* (2013.01)

(58) Field of Classification Search
CPC .............. H04L 67/1044; H04L 67/1061; H04L 67/1068; H04L 69/24
USPC ............. 455/41.1, 41.2, 416, 434, 518, 519; 709/204, 228, 225; 370/254, 312, 338, 370/315, 337, 350
See application file for complete search history.

(56) References Cited

U.S. PATENT DOCUMENTS

| | | | | |
|---|---|---|---|---|
| 7,701,900 B2* | 4/2010 | Barnum | ................ | H04W 8/005 370/329 |
| 2005/0174950 A1* | 8/2005 | Ayyagari | ................ | H04L 41/12 370/254 |
| 2005/0193106 A1 | 9/2005 | Desai et al. | | |
| 2007/0115868 A1* | 5/2007 | Chen | ...................... | G08G 1/163 370/315 |
| 2007/0168508 A1* | 7/2007 | Wang | .................. | G06F 11/2289 709/225 |
| 2007/0225024 A1* | 9/2007 | Li | ........................... | H04L 63/08 455/518 |
| 2007/0297613 A1* | 12/2007 | Ghosh | .................. | H04L 9/0836 380/277 |

(Continued)

*Primary Examiner* — Tan H Trinh

(57) ABSTRACT

Systems, methods, software and apparatus enable communication group discovery and formation that includes operating a group communication service that is linked to communication nodes and that receives a communication group formation request from a requesting node. The group communication service transmits discovery data that is provided to a relevant group of the communication nodes, such as those within a selected range of the request node. Other nodes that wish to form a communication group send election responses to the group communication service, which then establishes the communication group. In some implementations the requesting node transmits the discovery data received from the group communication service to other communication nodes using low-energy transmissions. In some implementations the group communication service transmits the discovery data to local communication nodes located within a proximity range of the requesting node.

20 Claims, 7 Drawing Sheets

(56) References Cited

U.S. PATENT DOCUMENTS

| | | | |
|---|---|---|---|
| 2008/0090560 A1* | 4/2008 | Bouzid | G06Q 10/10 455/416 |
| 2009/0132540 A1* | 5/2009 | Hjelm | H04L 67/24 |
| 2010/0070758 A1* | 3/2010 | Low | H04W 4/08 713/155 |
| 2012/0051244 A1* | 3/2012 | Nagara | H04W 8/005 370/252 |
| 2012/0134349 A1* | 5/2012 | Jung | H04W 8/005 370/338 |
| 2012/0158981 A1* | 6/2012 | Desai | H04L 67/1093 709/230 |
| 2013/0036231 A1* | 2/2013 | Suumaki | H04W 12/04 709/228 |
| 2013/0294324 A1 | 11/2013 | Corson et al. | |
| 2014/0043430 A1* | 2/2014 | Yu | H04N 7/15 348/14.08 |
| 2014/0075523 A1* | 3/2014 | Tuomaala | H04L 63/083 726/6 |
| 2014/0334464 A1* | 11/2014 | Qi | H04W 4/08 370/338 |
| 2014/0359018 A1* | 12/2014 | Sun | H04L 65/403 709/204 |
| 2015/0003809 A1* | 1/2015 | Matsuda | G11B 27/105 386/248 |
| 2015/0023342 A1* | 1/2015 | Joo | H04W 56/0035 370/350 |
| 2015/0264091 A1* | 9/2015 | Lin | H04L 67/12 709/228 |
| 2015/0264723 A1* | 9/2015 | Cheng | H04W 48/10 455/41.2 |
| 2015/0319029 A1 | 11/2015 | Abraham et al. | |
| 2015/0334555 A1* | 11/2015 | Seo | H04W 84/18 370/254 |
| 2015/0350866 A1* | 12/2015 | Patil | H04W 8/005 370/254 |
| 2015/0350906 A1* | 12/2015 | Patil | H04W 12/06 713/168 |
| 2015/0372894 A1* | 12/2015 | Huang | H04L 43/10 709/204 |
| 2016/0105773 A1* | 4/2016 | Wawrowski | H04W 4/029 455/456.2 |
| 2016/0135239 A1* | 5/2016 | Khoryaev | H04W 76/023 370/329 |
| 2016/0165411 A1 | 6/2016 | Lee et al. | |
| 2016/0165658 A1* | 6/2016 | Lee | H04W 76/14 455/434 |
| 2016/0269374 A1* | 9/2016 | Smith | H04L 63/065 |
| 2016/0302248 A1* | 10/2016 | Yi | H04W 76/023 |
| 2017/0078828 A1* | 3/2017 | Watfa | H04W 76/14 |
| 2017/0134182 A1* | 5/2017 | Davis | H04W 4/70 |
| 2017/0223665 A1* | 8/2017 | Chun | H04W 72/005 |
| 2017/0230799 A1* | 8/2017 | Wawrowski | H04W 4/029 |
| 2017/0364885 A1* | 12/2017 | Fan | G06Q 50/01 |
| 2018/0091361 A1* | 3/2018 | Smith | H04L 41/0668 |
| 2018/0115937 A1* | 4/2018 | Poitau | H04W 76/14 |
| 2018/0124654 A1* | 5/2018 | Kim | H04W 36/0027 |
| 2018/0227736 A1* | 8/2018 | Lee | H04W 88/02 |

\* cited by examiner

DISCOVERY AND FORMATION OF LOCAL COMMUNICATION GROUP

RELATED APPLICATIONS

This application hereby claims the benefit of and priority to the following, which is incorporated by reference in its entirety (including any appendices thereto): U.S. Provisional Patent Application 62/352,607, entitled "DISCOVERY AND FORMATION OF LOCAL COMMUNICATION GROUP," filed 21 Jun. 2016.

TECHNICAL FIELD

Aspects of the disclosure are related to group communication and in particular to end user devices and applications for efficient group communication.

TECHNICAL BACKGROUND

Various communication devices can be employed to facilitate communication between users. These devices can include cellular telephones, smartphones, discrete devices, computers, gaming devices and tablets, among others, which provide an efficient and robust way for users to communicate without being in the same physical location. These devices may be linked together to enable communications among members of a communication group that includes some, but not all, communication devices on a network.

Group members can use these devices for real-time communication among various groups' members, who may transfer audio, video, or text data between members' devices. Groups can be formed on the basis of a variety of criteria. For example, groups may be based on job description, job location, interests, hobbies, issues, clubs, and the like. However, in situations where a number of communication device users are in the same general location, but are not aware of one another, it has been difficult to identify potential group members and to establish a communication group of such users.

OVERVIEW

In some implementations of communication group discovery and formation, methods, apparatus and the like include a group communication service receiving a communication group formation request from a requesting communication node, which can include a communication device. In addition to the group formation request, the requesting node can provide other information, such as location information and/or other attribute data, some of which may be updated dynamically. When the group communication service receives the group formation request, it can then transmit a discovery message to initiate identification of potential group members. In some implementations the discovery message is sent to the requesting communication node, which then broadcasts the discovery message (or at least discovery data contained in the discovery message) that enables other communication nodes (e.g., those within broadcast range of the requesting node) to elect to join the communication group. In other implementations the group communication service may use attributes such as location information about various communication nodes to notify relevant communication nodes about the group formation request. Communication nodes other than the requesting node can then reply to the group communication service by sending election messages, where each election message can be a response that indicates a given communication node's user's desire to join the communication group. The group communication service thereafter establishes the communication group using collected election responses.

In implementations where the discovery message is sent only to the requesting communication node, that node can broadcast the discovery message (or relevant discovery data contained in the discovery message) to other communication nodes that are in the requesting node's vicinity (or proximity range), for example by using low-energy transmission to local communication nodes within the low-energy transmission's limited range. Communication nodes that receive the requesting node's transmission may then transmit their election responses to the group communication service. One or more of these implementations can be carried out using a non-transitory computer readable storage medium having stored program instructions that operate the group communication service in a manner described herein.

This Overview is provided to introduce a selection of concepts in a simplified form that are further described below in the Technical Disclosure. It may be understood that this Overview is not intended to identify or emphasize key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Examples herein discuss communication nodes that enable group communication sessions among various users. These communication nodes can include discrete devices specialized for group communications that include one or more wireless transceivers and user interface elements that streamline group communications. Communications groups can be initiated and altered either by user intervention or automatically by a shared group communication service such as a system that responds to one or more dynamic factors to create, change or dissolve groups or group status.

From a technical perspective, currently available solutions for discovering and inviting potential members to form a communication group cannot quickly, easily, and dynamically form such groups based on the general proximity of potential members (e.g., members located within a prescribed radius-defined or other nearby area around a given user). Implementations of communication group discovery and formation disclosed herein facilitate such dynamic formation activity and the like, including one or more methods for easily detecting nearby communication nodes, and inviting their users to form and/or join a communication group.

Figure 1A:
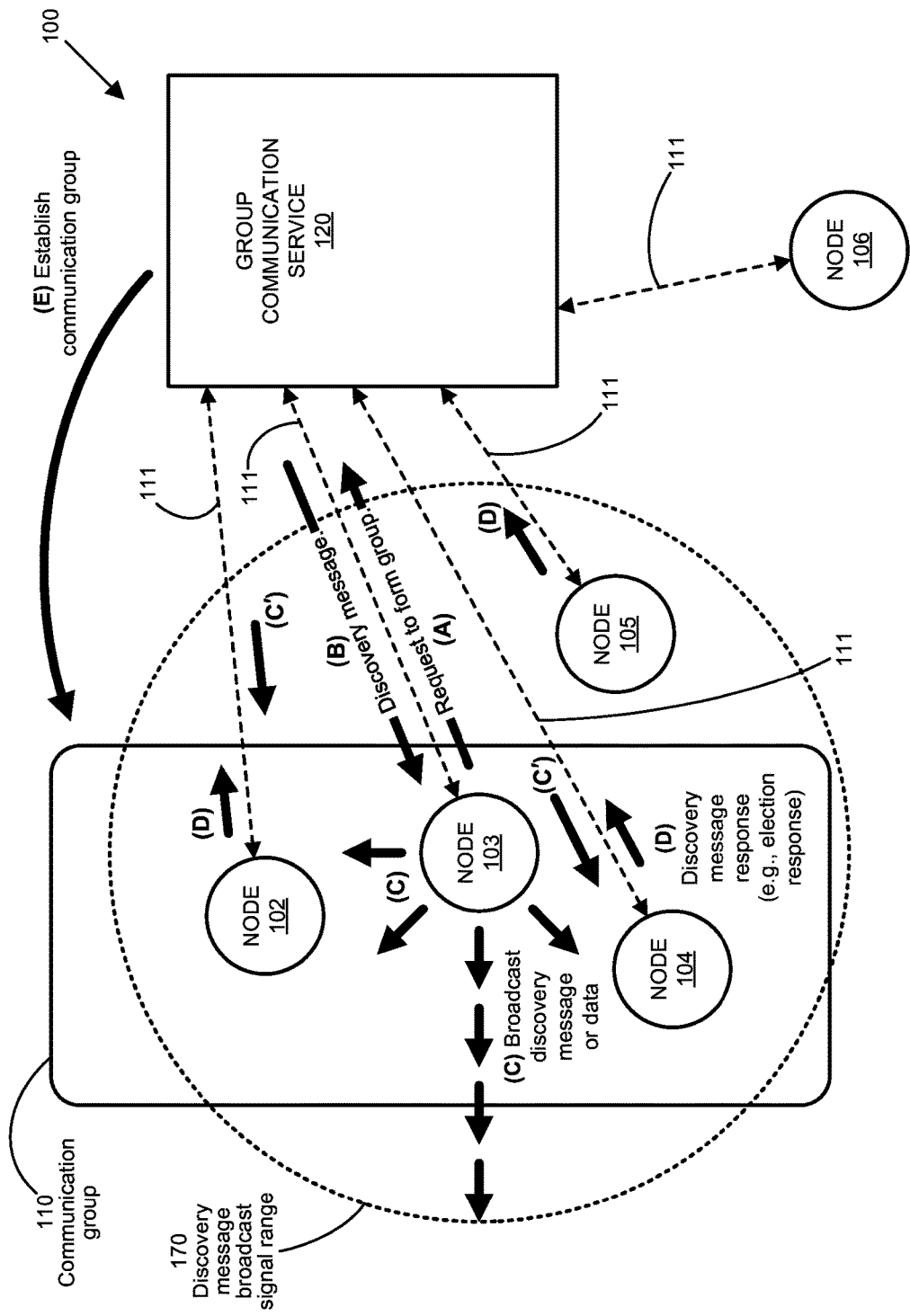
FIG. 1A illustrates a communication system.

In a first non-limiting example, FIG. 1A shows a communication system 100 configured to form user node communication groups having various user communication nodes as members, such as communication nodes 102, 103, 104, 105, 106. System 100 also includes a group communication service 120 that can control and direct nodes 102-106.

Communication nodes 102-106 may comprise transceivers, audio transducers, processing systems, storage devices (including software stored thereon), communication interfaces, environmental sensors, accelerometers, gyroscopes, Global Positioning System (GPS) receivers, user interfaces, and other systems; not all of the nodes 102-106 are necessarily identical in composition and operation. Moreover, each node 102-106 can include a communication device that comprises a smartphone, cellphone, laptop, tablet, computer, gaining device, or some other communication device capable of communicating with group communication service 120 using the Internet or some other appropriate communication network. Group communication service 120 may comprise a computing system having one or more servers and/or other computing devices capable of managing services for a plurality of user communication nodes, such as nodes 102-106.

Nodes 102-106 can communicate with group communication service 120 over one or more various communication links, such as communication links 111, which may use the Internet or other appropriate communication networks. Each communication link can comprise one or more wireless links (e.g., that can each further include Long Term Evolution (LTE), Global System For Mobile Communications (GSM), Code Division Multiple Access (CDMA), IEEE 802.11 WiFi, Bluetooth, Personal Area Networks (PANs), Wide Area Networks, (WANs), Local Area Networks (LANs), or Wireless Local Area Networks (WLANs), including combinations, variations, and improvements thereof). These communication links can facilitate implementing any communication protocol suitable for wireless communications, such as Internet Protocol (IP) or Ethernet.

Additionally, communication links can include one or more wired portions (e.g., which can comprise synchronous optical networking (SONET), hybrid fiber-coax (HFC), Time Division Multiplex (TDM), asynchronous transfer mode (ATM), circuit-switched, communication signaling, or some other communication signaling, including combinations, variations or improvements thereof and can utilize metal, glass, optical, air, space, or some other material as the transport media). Links 111 may each be a direct link, or may include intermediate networks, systems, or devices, and may include a logical network link transported over multiple physical links.

Communication nodes 102-106 periodically transmit messages to group communication service 120 indicating dynamic and/or other changes in one or more node attributes (e.g., location). Such messages may be sent at appropriate times and under appropriate circumstances (e.g., whenever a node attribute changes sufficiently, or at prescribed intervals). Group communication service 120 can use information regarding changes in one or more node attributes to form communication groups, and for intelligent agent features provided to or on behalf of nodes 102-106. Although group communication service 120 and nodes 102-106 are each shown as separate entities in the Figures, it should be understood that some features of group communication service 120 can be included in nodes 102-106 as well.

Exemplary operation of system 100 also is illustrated in FIG. 1A, one operational sequence of which is designated by the reference letters (A) through (E), though these and/or other steps could be performed in other ways in various implementations. In the non-limiting example illustrated in FIG. 1A, each of the nodes 102-106 is controlled by a user who may be unaware of the presence and/or communication availability of other nearby users. For example, the users may be attending the same sporting event, driving near each other on the freeway, dining at the same restaurant, occupying the same building but in different offices, or the like. In FIG. 1A, the user of node 103 wishes to create a local communication group and, as an initiating user, wants and/or needs to know if there are other users nearby. The user of communication node 103 (the requesting communication node) transmits a local group formation request (A) over link 111 to group communication service 120, requesting that group communication service 120 establish a local communication group. Service 120 responsively transmits (B) a group discovery message to requesting node 103. The group discovery message can include discovery data related to the formation of a local communication group (e.g., the identity of node 103's user, node 103's location, the proposed group's purpose, etc.).

Requesting node 103 then transmits (C) a limited-range (e.g., low-power as one non-limiting example) wireless signal containing the group discovery data (e.g., by forwarding and/or re-transmitting the discovery message, or transmitting at least discovery data contained in the discovery message from service 120). In one non-limiting example, requesting node 103 transmits the group discovery message and/or discovery data using a low-power wireless transmitter to any other communication nodes within the low-power wireless signal's broadcast range 170. This low-power wireless signal may comprise a Radio Data System signal, a Bluetooth beacon, a WiFi beacon, an iBeacon, a Bluetooth low energy signal, or the like. In fact, the low-power wireless signal may take the form of one or more wireless links that can each further include Long Term Evolution (LTE), Global System For Mobile Communications (GSM), Code Division Multiple Access (CDMA), IEEE 802.11 Bluetooth, Personal Area Networks (PANs), Wide Area Networks, (WANs), Local Area Networks (LANs), or Wireless Local Area Networks (WLANs), including combinations, variations, and improvements thereof. These signals can carry any communication protocol suitable for wireless communications, such as Internet Protocol (IP) or Ethernet. The discovery data broadcast by node 103 can include information useful to local nodes and/or their users) deciding whether or not to join the proposed/requested communication group. Non-limiting examples of such discovery data information include a requesting communication device identifier, a requesting communication device location, and/or the purpose for which the communication group is being formed. Other types of information can be used in the discovery data to assist local nodes in deciding whether to join.

In addition to requesting node 103, three communication nodes 102, 104, 105 are within the low-power wireless signal range 170 and thus receive the broadcast discovery message/data. Node 106 is outside of range 170 (e.g., is not "local" relative to the discovery message/data broadcast) and thus does not receive the discovery broadcast (C) by node 103. In response to the group discovery data message, communication nodes 102, 104, 105 transmit discovery message responses (D) to group communication service 120. In the illustrated example, nodes 102, 104 elect to join a communication group by sending election responses accepting, while node 105 declines to join. In various implementations node 105 might send a refusal response or might merely fail to respond and thus be excluded from the newly-established communication group.

Group communication service 120 utilizes user node information (e.g., previously obtained, obtained via the discovery message responses, or otherwise obtained) to establish (E) communication group 110 at the invitation of requesting communication node 103. In this example, communication nodes 102, 103, 104 now comprise local communication group 110, while communication nodes 105, 106 remain outside the group.

In other implementations the discovery message (13) sent by service 120 and discovery message/data broadcast (C) by requesting node 103 can be replaced with group communication service 120 transmitting (C') the discovery data and/or discovery message directly to "local" nodes 102, 104, 105, Where the status of a node as "local" (e.g., within a given proximity range of the requesting node, for example where the location of a local communication node within the proximity range can be determined based on attribute data collected by the group communication service from the request communication node and one or more additional communication nodes) can be defined by service 120 using attributes and/or other data that allow service 120 to determine which nodes are in the vicinity of requesting node 103. This can be done, for example, when updated attribute data about a given node includes information about that node's location.

Figure 1B:
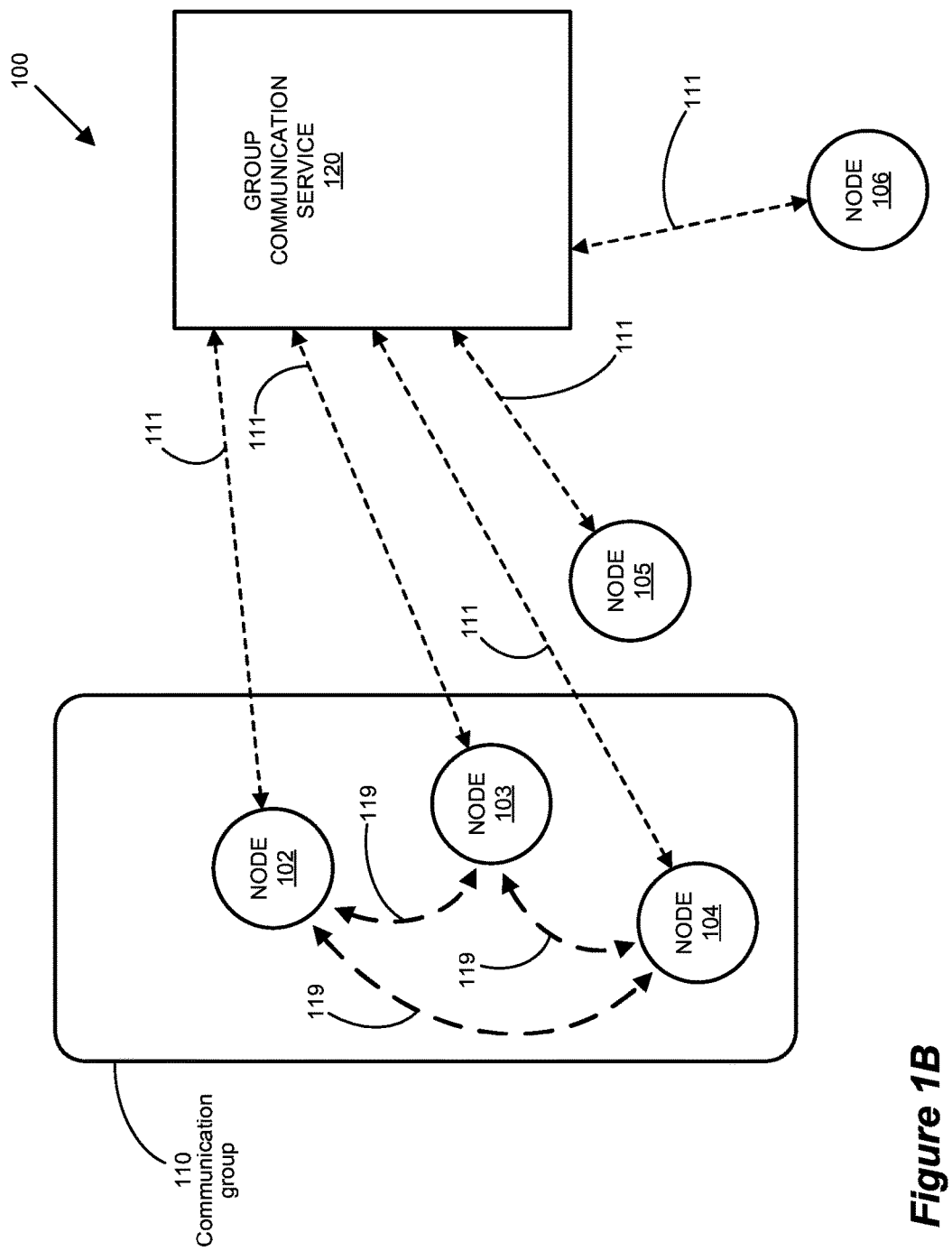
FIG. 1B illustrates a communication system.

Within communication group 110, nodes 102-104 may communicate with each other directly (e.g., over communication links 119 as shown in FIG. 1B) and/or via service 120 (e.g., using links 111, where links 111 and service 120 can comprise a mesh network among communication group 110's nodes 102-104, and possibly other nodes). Furthermore, links 119 can comprise Bluetooth, IEEE 802.11 WiFi, infrared, ultrasonic, or any wireless communication format including combinations, variations or improvements thereof, each link using air or space as the transport media.

Communication nodes may use secure communication methods for communicating with a group communication service and with other nodes. Secure communication methods include implementations in which users and nodes can securely share communications and other information without unauthorized interception or monitoring (e.g., utilizing symmetric key encryption, asymmetric key encryption, public-key encryption, or some other type of encryption, including combinations thereof). Such security can be implemented within and by communication nodes and associated links (e.g., independently or in combination). End to end encryption of communications, such as audio communications, can be established among group members (e.g., nodes 102-105 of FIG. 1B) and can include transport layer security (TLS) or secure sockets layer (SSL) communications, among other secure link types.

Figure 2:
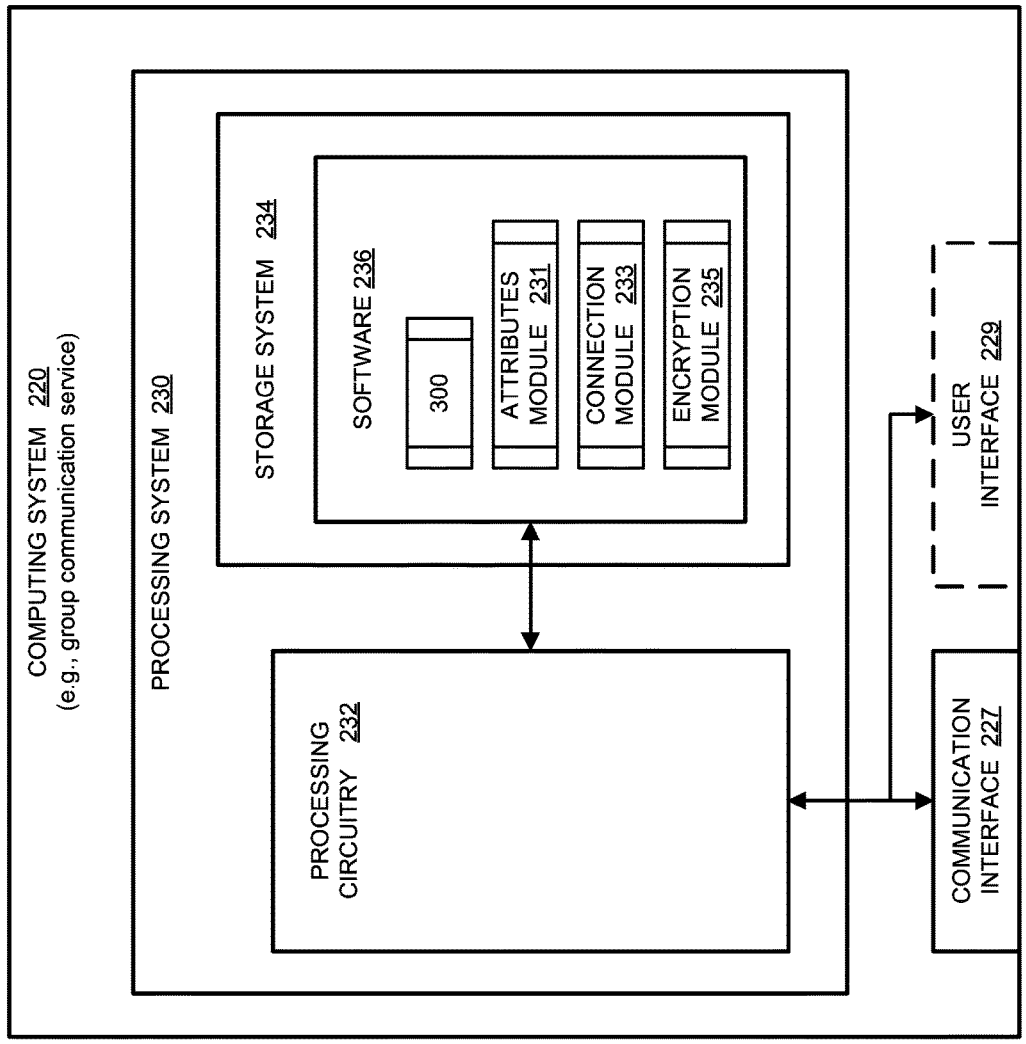
FIG. 2 illustrates a computing system.

FIG. 2 illustrates a computing architecture implemented as a computing system 220 to implement one or more non-limiting exemplary group communication systems and/or operations described in FIGS. 1A and 1B. Computing system 220 is representative of a computing architecture that may be employed as any computing apparatus, system, or device, or collections thereof, to implement one or more of the systems, methods, operations and/or devices in FIGS. 1A and 1B (e.g., the group communication service 120 of FIGS. 1A and 1B, and/or all or part of each communication node 102-106 illustrated in FIGS. 1A and 1B). Computing system 220 comprises communication interface system 227, an optional user interface system 229, and processing system 230. Processing system 230 is communicatively linked to communication interface system 227 and user interface system 229. Processing system 230 includes processing circuitry 232 and memory device 234 that stores software 236 (e.g., comprising operating software, data processing applications, communication applications, management applications, operating system software).

It may be understood that computing system 220 is generally intended to represent one or more computing systems on which software 236 may be deployed and executed (e.g., in order to implement group communication service 120 or a communication node 102-106). However, computing system 220 may also be suitable as any computing system on which software 236 can be staged and from where one or both may be distributed, transported, downloaded, or otherwise provided to yet another computing system for deployment and execution, or yet additional distribution.

Communication between computing system 220 and any other computing system may occur over a communication network or networks and in accordance with various communication protocols, combinations of protocols, or variations thereof. Examples of such communication networks include intranets, internets, the Internet, local area networks, wide area networks, wireless networks, wired networks, virtual networks, software defined networks, data center buses, computing backplanes, or any other type of network, combination of network, or variation thereof. Some communication protocols that may be used include, but are not limited to, the Internet protocol (IP, IPv4, IPv6), the transfer control protocol (TCP), and the user datagram protocol (UDP), as well as any other suitable communication protocol, variation, or combination thereof.

Communication interface system 227 comprises components that communicate over communication links, such as network cards, ports, RF transceivers, processing circuitry and software, or some other communication devices. Communication interface system 227 can be configured to communicate over metallic, wireless, or optical links and can be configured to use TDM, IP, Ethernet, optical networking, wireless protocols, communication signaling, or some other communication format—including combinations thereof.

User interface system 229 comprises components that permit and facilitate interaction between a user and computing system 220. User interface system 229 may include a keyboard, a mouse, a touchscreen, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 229. In some implementations, the input and output devices may be combined in a single device, such as a display capable of displaying images and receiving touch gestures.

User interface system 229 may also include associated user interface software executable by processing circuitry 232 in support of the various user input and output devices discussed above. Separately or in conjunction with each other and other hardware and software elements, user interface software and user interface devices may support a graphical user interface, a natural user interface, and/or any other type of user interface. In addition, user input made with respect to the user interfaces may be input via user interface system 229. User interface system 229 can be omitted in some implementations.

Processing circuitry 232 can comprise one or more microprocessors and other processing circuitry that retrieves and executes software 236 from storage system 234. Processing circuitry 232 can be implemented within a single processing device but can also be distributed across multiple processing devices or sub-systems that cooperate in executing program instructions. Examples of processing circuitry 232 include general purpose central processing units, application specific processors, and logic devices, as well as any other type of processing device, combinations, or variations thereof. In some examples, portions of processing circuitry 232 is physically separate from some elements of computing system 220 and area included in remote servers, cloud-based processing systems, or virtualized computing systems.

Storage system 234 can comprise any non-transitory computer readable storage media capable of storing software 236 that is executable by processing circuitry 232. Storage system 234 can also include various data structures which comprise one or more databases, tables, lists, or other data structures. Storage system 234 can include volatile and nonvolatile, removable and non-removable media implemented in any method or technology for storage of information, such as computer readable instructions, data structures, program modules, or other data. Storage system 234 can be implemented as a single storage device but can also be implemented across multiple storage devices or sub-systems co-located or distributed relative to each other. Storage system 234 can comprise additional elements, such as a controller, capable of communicating with processing circuitry 232. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof. In no case is the computer readable storage media a propagated signal.

Software 236 can be implemented in program instructions and among other functions can, when executed by computing system 220 in general or processing circuitry 232 in particular, direct system 220, or processing circuitry 232 to operate as described herein for a group communication service and/or other functional systems, including one or more implementations of communication group member discovery and creation. Software 236 can include additional processes, programs, or components, such as operating system software, database software, or application software and also can comprise firmware or some other form of machine-readable processing instructions executable by elements of processing circuitry 232. Software 236 may include any number of software modules to provide the group communication operations described herein.

In at least one implementation, the program instructions can include attributes module 231, connection module 233, and encryption module 235. In some implementations attributes module 231 monitors one or more attributes of user communication nodes (e.g., personal communication devices, linked end user devices, etc.) and transmits and/or receives messages that can include information regarding dynamic changes in the one or more attributes. These attributes and dynamic changes in attributes can be used to form and change dynamic communication groups among user communication nodes and intelligent agent nodes. Attributes module 231 may periodically or continuously monitor attributes associated with communication node sensors. Also, user communication nodes may send messaging or alerts to attributes module 231 when changes are detected. For example, attributes module 231 can receive attributes from communication nodes 102-106, and transmit attributes to communication nodes 102-106 over communication links such as communication links 111.

Connection module 233 can evaluate numerous attributes from the various communication nodes 102-106 and, based on those attributes, automatically create, modify and/or dissolve communication groups, such as local communication group 110 requested by communication node 103. Connection module 233 (and/or elsewhere in storage system 234) can contain a list of pre-configured group parameters that can assist in automatically creating, modifying and/or dissolving pre-configured groups (e.g., when tokens and/or other data or communications are received from two or more member communication nodes). Connection module 233 also can delegate group formation and modification functionality to a master node enabling it to create and modify one or more slave nodes and/or groups of slave nodes.

Encryption module 235 manages encryption functions for communication nodes (e.g., receiving requests for keys from nodes 102-106 and generating encryption keys for transfer to the nodes over control channels). In some examples, encryption module 235 (and/or other locations elsewhere in storage system 234) contains device keys for the various communication nodes that can be indexed to communication node identifies. Such key data is kept physically and electronically secure from outside access because it is used to encrypt keys that can then be transferred over control channels to the various communication nodes.

In general, software 236 can, when loaded into processing circuitry 232 and executed, transform processing circuitry 232 overall from a general-purpose computing system into a special-purpose computing system customized to operate as described herein for a group communication service, including operating to implement communication group member discovery and creation, among other operations. Encoding software 236 on storage system 234 can transform the physical structure of storage system 234. The specific transformation of the physical structure can depend on various factors in different implementations of this description. Examples of such factors can include, but are not limited to the technology used to implement the storage media of storage system 234 and whether the computer-storage media are characterized as primary or secondary storage. For example, if the computer-storage media are implemented as semiconductor-based memory, software 236 can transform the physical state of the semiconductor memory when the program is encoded therein. For example, software 236 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

Figure 3:
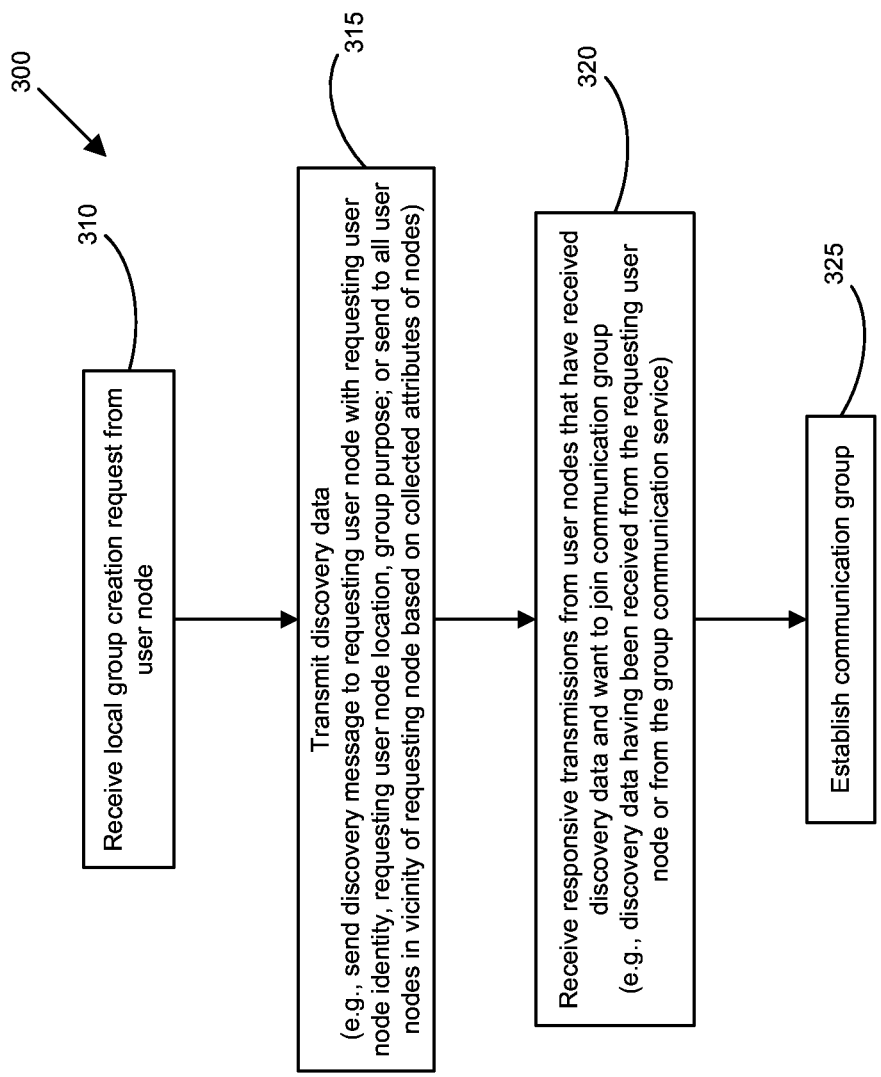
FIG. 3 illustrates a method for operating a group communication service.

FIG. 3 illustrates a method 300 for operating group communication service 120 as illustrated in FIGS. 1A and 1B (method 300 may be implemented as software 300 in computing system 220 of FIG. 2). Group communication service 120 receives a request (310) from requesting node 103 (e.g., over communication link 111), requesting formation of a local communication group. Group communication service 120 transmits a group discovery message (315), which can be sent over communication link 111 to a single communication node (e.g., requesting node 103) that distributes discovery data to other nodes within a prescribed area, or it can be sent to any communication links that are in the vicinity of the requesting node 103 (e.g., based on attributes and/or other information available to the group communication service 120 at the time the request is made).

In some implementations requesting node 103 then transmits the group discovery message (or at least the discovery data) in a low-power wireless signal having a defined, limited range (e.g., as directed by group communication service 120, perhaps as included in the discovery message from service 120). In such implementations group communication service 120 then receives one or more responsive transmissions (e.g., election responses) from one or more "local" (i.e., within broadcast range of node 103) communication nodes 102, 104, 105 electing to join the local communication group being formed at the request of communication node 103.

In other implementations the discovery message (or other transmission containing discovery data) can be sent (315) by group communication service 120 to all "local" communication nodes (i.e., in this type of situation, local nodes may be those within a specified distance of the requesting node 103, based on attribute data (e.g., location) that service 120 has for the communication nodes with which it communicates). Each local node in this type of implementation can then elect to join the newly forming local communication group or not in responsive transmissions (320) to group communication service 120.

Finally, remote management system 120 establishes (325) local communication group 110 comprising the requesting node 103 and the one or more local communication nodes 102, 104 electing to join local communication group 110.

Figure 4:
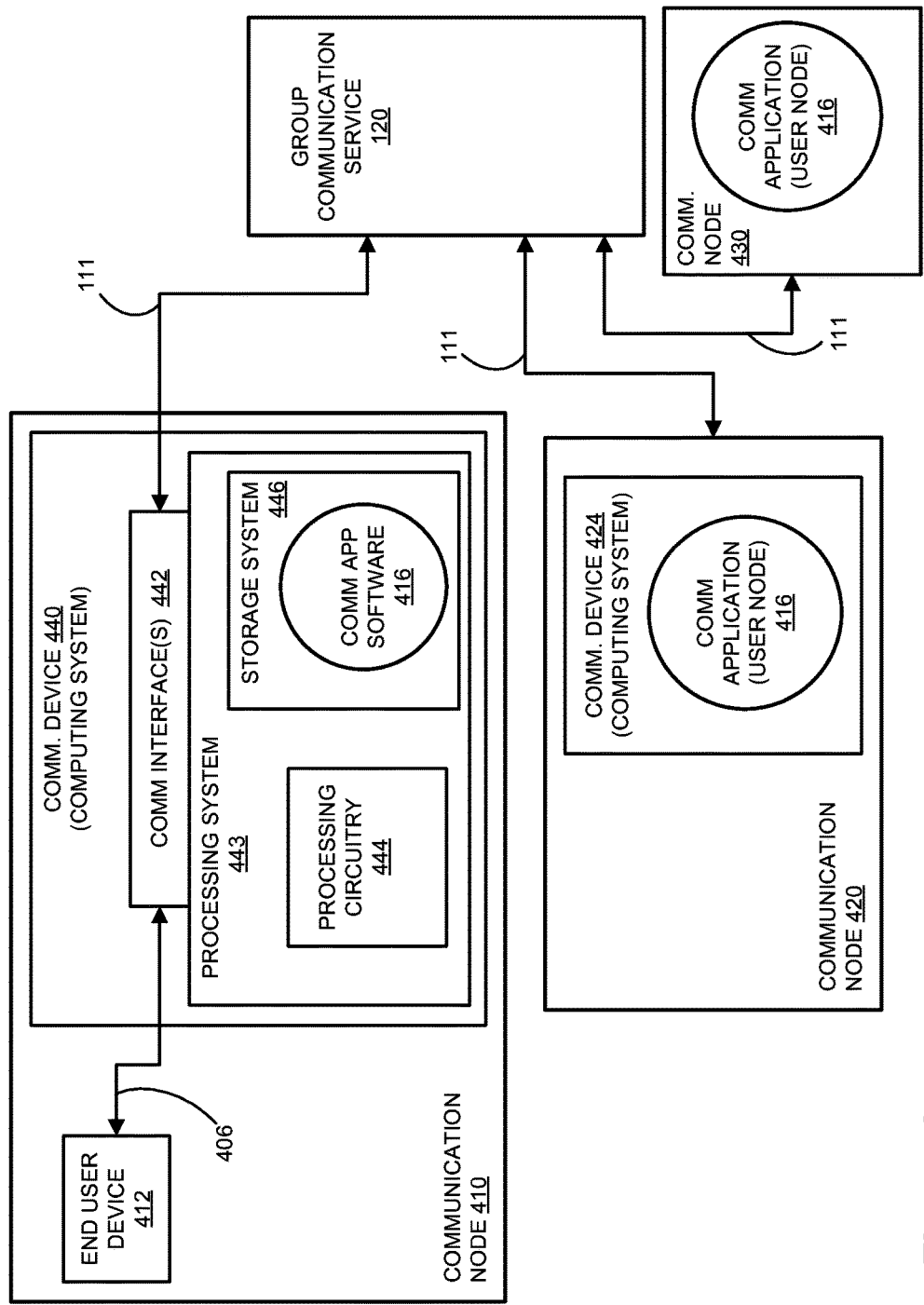
FIG. 4 illustrates one or more communication nodes.

FIG. 4 illustrates non-limiting examples of communication nodes 410, 420, 430, each of which can be employed in connection with a distributed group communication system (e.g., as one or more of nodes 102-106 of FIGS. 1A and 1B). User communication node 410 comprises an end user device 412 (e.g., a wearable end user device that operates as a push-to-talk (PTT) device in some non-limiting examples) that is communicatively (e.g., wirelessly) linked to an intermediate communication device 440 using link 406. End user device 412 may comprise a speaker, microphone, processing system, communication interface, and a user interface to provide communications over intermediate communication device 440 to group communication service 120 and other communication nodes (which may or may not include similar end user devices). In operation, end user device 412 can be configured to allow an end user to communicate with one or more members of a group and/or group communication service 120 via communication links 406, 111 without having to provide user input to intermediate communication device 440. End user devices may be required to provide authentication and/or other information to link to their respective intermediate communication devices, after which a user can utilize a linked end user device to communicate directly with other members of a group and service 120.

The communication device 440 of node 410 comprises communication interface system 442 and processing system 443. Processing system 443 further comprises processing circuitry 444 and storage system 446. Processing circuitry 444 comprises microprocessors and other circuitry that retrieves and executes software (including, for example, communication application software 416) from storage system 446. Processing circuitry 444 may comprise a single device or can be distributed across multiple devices—including devices in different geographic areas. Processing circuitry 444 may be embedded in various types of equipment.

Storage system 446 comprises a non-transitory computer readable storage medium, such as a disk drive, flash drive, data storage circuitry, or some other hardware memory apparatus. Storage system 446 may comprise a single device or could be distributed across multiple devices—including devices in different geographic areas, Storage system 446 may be embedded in various types of equipment. In some examples, a computer apparatus could comprise processing circuitry 444, storage system 446 and software stored on system 446, which may include operating systems, utilities, drivers, network interfaces, applications, or some other type of software, including communication application software 416. In no case is any computer readable storage media used in such implementations a propagated signal.

Communication interface system 442 further can include one or more transceivers for communicating with end user device 412, and one or more low-power wireless transceivers for broadcasting and receiving group discovery messages. Such transceivers can comprise communication components, such as ports, signal processing circuitry, memory, software, and the like and can communicate with an end user device 412 over a link that may comprise a Bluetooth communication link, WiFi link, infrared, ultrasonic or any other communication link.

Low-power wireless transceivers can comprise communication components, such as ports, signal processing circuitry, memory, software, and the like. The low-power wireless signal produced by such low-power wireless transceivers may comprise a Radio Data System signal, a Bluetooth beacon, a WiFi beacon, an iBeacon, or the like. In fact, the low-power wireless signal may take the form of one or more wireless links that can each further include Long Term Evolution (LTE), Global System For Mobile Communications (GSM), Code Division Multiple Access (CDMA), IEEE 802.11 WiFi, Bluetooth, Personal Area Networks (PANs), Wide Area Networks, (WANs), Local Area Networks (LANs), or Wireless Local Area Networks (WLANs), including combinations, variations, and improvements thereof. These signals can carry any communication protocol suitable for wireless communications, such as Internet Protocol (IP) or Ethernet.

Another illustrative, non-limiting example is shown as node 420 which comprises a communication device 424 that can be similar to device 440, also in communication with service 120, but which may or may not operate with the additional use of a separate end user device. Communication device 424 can be configured to retrieve and execute software such as communication application 416.

A third illustrative, non-limiting example includes node 430 communicatively connected to service 120 by link 111, which may comprise a processing system further comprising processing circuitry and a storage system. Processing circuitry may comprise microprocessors and other circuitry that retrieves and executes software such as communication application 416. Processing circuitry may comprise a single device or could be distributed across multiple devices including devices in different geographic areas. Processing circuitry may be embedded in various types of equipment.

Node 430 may also comprise a storage system further comprising a non-transitory computer readable storage medium, such as a disk drive, flash drive, data storage circuitry, or some other hardware memory apparatus. The storage system may comprise a single device or could be distributed across multiple devices—including devices in different geographic areas. The storage system may be embedded in various types of equipment. Node 430 further comprises software which may include operating systems, utilities, drivers, network interfaces, applications, or some other type of software, including communication application 416, in no case is the computer readable storage media a propagated signal.

In some implementations, the communication systems can create and transmit recordings of voice or other acoustic signals, sending those discrete recordings out to communication group members. In some implementations, each end user device can be implemented in a half-duplex type of operational mode. That is, a device in a communication node linked to a communication group or the like can transmit and receive, but cannot do both at the same time. A "push-to-talk" operational mode allows an end user to press a transmit toggle button or the like (e.g., by pushing and holding a toggle) to initiate sending a voice communication to one or more users in the communication group. While the toggle is in its "transmit" position, an end user device is configured to collect audio data from the user (e.g., recording voice communications). This can be done in a variety of ways. The collected audio data can be held in the end user device or in a linked intermediate communication device (e.g., a smartphone, cellphone, gaining device, tablet, or laptop). When the toggle is switched back to its "receive" position, any collected audio data is transmitted to the one or more communication group members. The collected audio data can be transmitted using any appropriate transmission scheme. In one non-limiting example discussed below, audio data collected by an end user device can be transmitted to its linked intermediate communication device (e.g., via one of the Bluetooth modes). Likewise, audio data collected by an intermediate communication device can be sent over a broader network using any appropriate communication protocol or scheme.

Figure 5A:
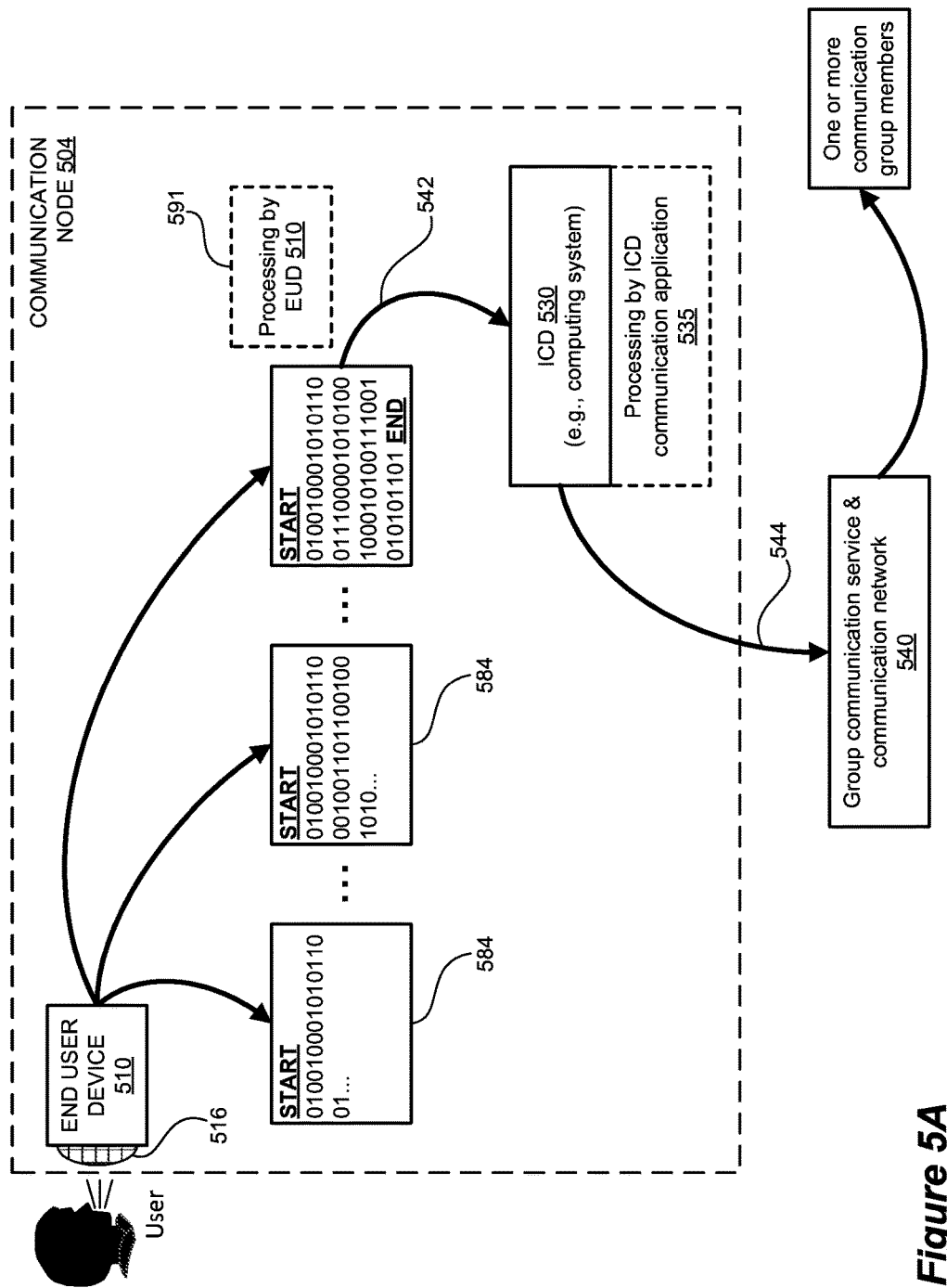
FIG. 5A illustrates communications between an end user device and an intermediate communication device.

In one implementation, a non-limiting example of which is illustrated in FIG. 5A, a communication node 504 includes an end user device 510 that has a microphone 516 configured to collect audio data from a human user. As illustrated in FIG. 5A, the end user device 510 begins storing the collected audio data in a memory location 584. This audio data collection process continues until the a push-to-talk button on end user device 510 is released (i.e., the END signal in FIG. 5A). Some additional processing 591 may be performed by end user device 510 before the collected audio data is transmitted at 542 to an intermediate communication device 530 that also is part of communication node 504. Again, some additional processing 535 may be performed by ICD 530 before it transmits at 544 the audio data to one or more additional communication group members via group communication service and communication network 540. In some implementations, multiple members of a group can be collecting audio data, though while an EUD 510 or the like is collecting such audio data (i.e., while the push-to-talk button is in its transmit position) the ICD 530 and/or EUD 510 cannot play back audio data received from another user.

Figure 5B:
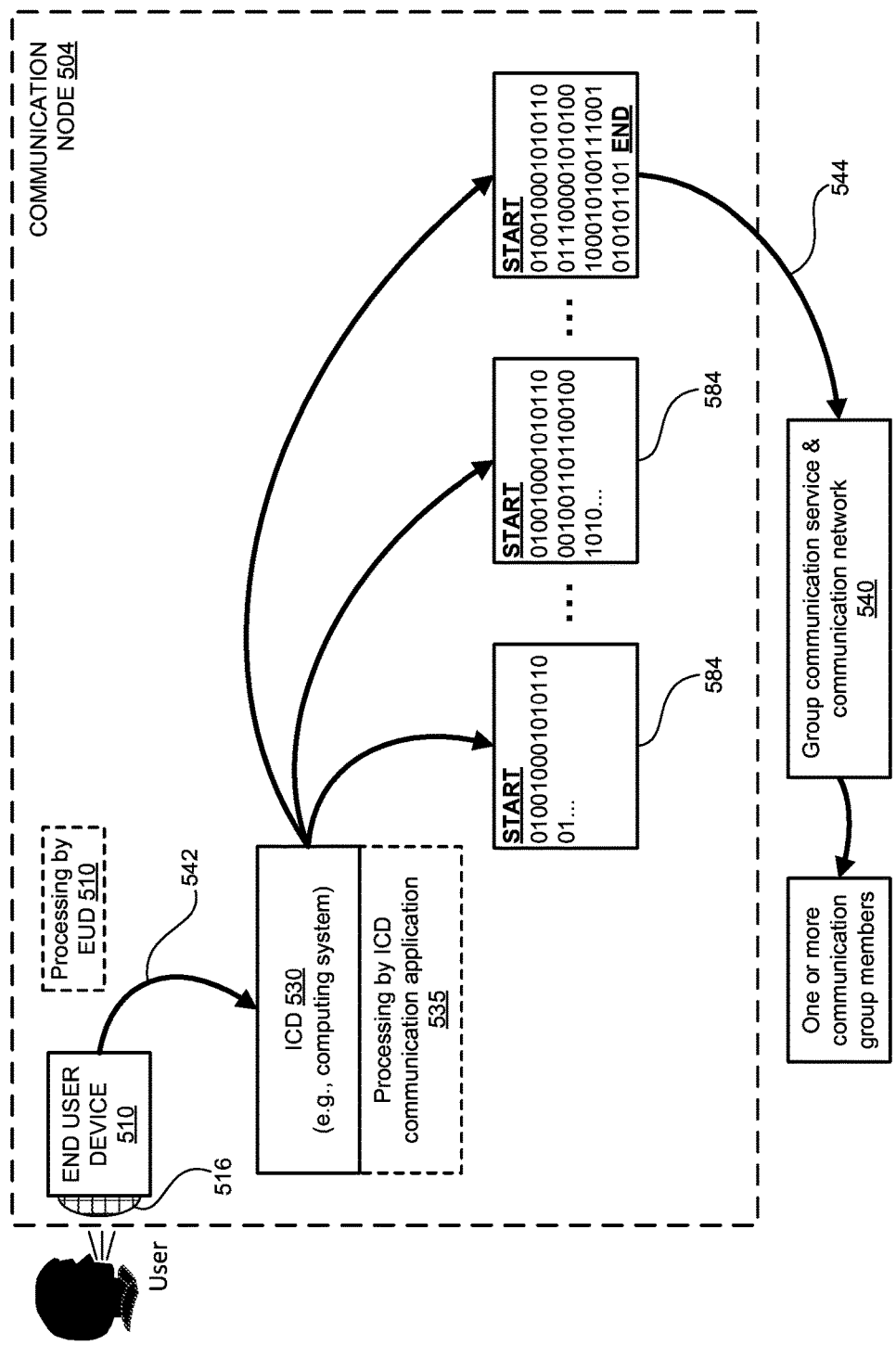
FIG. 5B illustrates communications between an end user device and an intermediate communication device.

In another non-limiting example shown in FIG. 5B, it is the intermediate communication device 530 that stores the collected audio data before it is transmitted via service and network 540. The end user device 510 may process audio data collected from a user prior to transmission at 543 to the ICD 530 (e.g., the collected audio data may be encrypted, buffered to permit error correction, assembled into packets, etc.). The intermediate communication device 530 builds the audio data until the push-to-talk button on the EUD 510 is switched back to receive, at which point the ICD 530 can transmit the collected audio data to group communication service and network 540 and thus to one or more communication group members or the like.

The included descriptions and figures depict specific implementations to teach those skilled in the art how to make and use the best mode. For the purpose of teaching inventive principles, some conventional aspects have been simplified or omitted. Those skilled in the art will appreciate variations front these implementations that fall within the scope of the invention. Those skilled in the art will also appreciate that the features described above may be combined in various ways to form multiple implementations. As a result, the invention is not limited to the specific implementations described above, but only by the claims and their equivalents.

What is claimed is:

1. A method of operating a group communication system, the method comprising:
receiving, at the group communication system, a communication group formation request from a requesting communication node, wherein a purpose for which the communication group is being formed is included with the communication group formation request;
transmitting from the group communication system to the requesting communication node a discovery message, wherein the discovery message comprises discovery data and the purpose, wherein the requesting communication node broadcasts the discovery data to a plurality of local communication nodes, and wherein each local communication node is located within a broadcasting range of the requesting communication node;
in response to the broadcasted discovery data, receiving, at the group communication system, an election message from an electing communication node, wherein the electing communication node is one of the plurality of local communication nodes; and
establishing a communication group, wherein the communication group comprises the requesting communication node and the electing communication node.

2. The method of claim 1 wherein the discovery data is configured to be broadcast by the requesting communication node to the plurality of local communication nodes using low-energy transmission having a limited broadcast range.

3. The method of claim 2 wherein the low-energy transmission is at least one of a Bluetooth transmission, an iBeacon transmission, and a WiFi transmission.

4. The method of claim 1 further comprising:
transmitting the discovery data to the plurality of local communication nodes.

5. The method of claim 1 wherein the requesting communication node broadcasts the discovery data to the plurality of local communication nodes.

6. The method of claim 1 wherein the discovery data comprises at least one of the following:
a requesting communication device identifier; and
a requesting communication device location.

7. The method of claim 1 wherein each communication node in the plurality of local communication nodes comprises an end user device communicatively linked to a communication device.

8. The method of claim 1 wherein each communication node in the plurality of local communication nodes comprises a communication device having a processing system executing a communication application.

9. A non-transitory computer readable storage medium having stored thereon program instructions to operate a group communication system, including instructions, which when executed by one or more processors of a computing system, cause the computing system to:

receive, at the group communication system, a communication group formation request from a requesting communication node, wherein a purpose for which the communication group is being formed is included with the communication group formation request;

transmit from the group communication system to the requesting communication node a discovery message, wherein the discovery message comprises discovery data and the purpose, wherein the requesting communication node broadcasts the discovery data to the plurality of local communication nodes, wherein each local communication node is located within a broadcasting range of the requesting communication node;

in response to the broadcasted discovery data, receive, at the group communication system, an election message from an electing communication node, wherein the electing communication node is one of the plurality of local communication nodes; and establish a communication group, wherein the communication group comprises the requesting communication node and the electing communication node.

10. The non-transitory computer readable storage medium of claim 9 wherein the discovery data is configured to be broadcast by the requesting communication node to the plurality of local communication nodes using low-energy transmission having a limited broadcast range.

11. The non-transitory computer readable storage medium of claim 10 wherein the low-energy transmission is at least one of a Bluetooth transmission, an iBeacon transmission, and a WiFi transmission.

12. The non-transitory computer readable storage medium of claim 9 wherein the instructions further cause the computing system to: transmit the discovery data to the plurality of local communication nodes.

13. The non-transitory computer readable storage medium of claim 9 wherein the requesting communication node broadcasts the discovery data to the plurality of local communication nodes.

14. The non-transitory computer readable storage medium of claim 9 wherein the discovery data comprises at least one of the following:
a requesting communication device identifier; and
a requesting communication device location.

15. The non-transitory computer readable storage medium of claim 9 wherein each communication node in the plurality of local communication nodes comprises an end user device communicatively linked to a communication device.

16. The non-transitory computer readable storage medium of claim 9 wherein each communication node in the plurality of local communication nodes comprises a communication device having a processing system executing a communication application.

17. A method of operating a group communication system to establish a communication group, the method comprising:

receiving, at the group communication system, a communication group formation request from a requesting communication node, wherein a purpose for which the communication group is being formed is included with the communication group formation request;

transmitting from the group communication system a discovery message to a plurality of local communication nodes, wherein each local communication node is located within a proximity range of the requesting node, and wherein the discovery message comprises discovery data and the purpose;

receiving, at the group communication system, an election response from an electing communication node, wherein the electing communication node is one of the plurality of local communication nodes and further wherein the election response is a response to the electing communication node having received the discovery message; and establishing the communication group, wherein the communication group comprises the requesting communication node and the electing communication node.

18. The method of claim 17 wherein each communication node comprises an end user device communicatively linked to an intermediate communication device, further wherein each intermediate communication device comprises a processing system executing a communication application.

19. The method of claim 17 wherein the discovery message comprises at least one of the following:
a requesting communication device identifier; and
a requesting communication device location.

20. The method of claim 17 wherein the location of a local communication node within the proximity range is determined based on attribute data collected from the requesting communication node and the plurality of communication nodes by the group communication service.

* * * * *